(12) United States Patent
Rafael

(10) Patent No.: US 9,261,871 B2
(45) Date of Patent: Feb. 16, 2016

(54) APPARATUS AND METHOD FOR DETERMINING OPERATION COMPATIBILITY BETWEEN FIELD DEVICES

(75) Inventor: Myla Valle Rafael, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 250 days.

(21) Appl. No.: 13/434,229

(22) Filed: Mar. 29, 2012

(65) Prior Publication Data

US 2013/0257627 A1 Oct. 3, 2013

(51) Int. Cl.
*G08B 3/00* (2006.01)
*G05B 19/042* (2006.01)

(52) U.S. Cl.
CPC ...... *G05B 19/042* (2013.01); *G05B 2219/2243* (2013.01)

(58) Field of Classification Search
CPC .................. G05B 19/042; G05B 2219/2243
USPC ................... 340/506, 511, 3.1, 539.1
See application file for complete search history.

(56) References Cited

U.S. PATENT DOCUMENTS 5,400,246 A * 3/1995 Wilson et al. ............... 700/17

* cited by examiner

*Primary Examiner* — Daryl Pope
(74) *Attorney, Agent, or Firm* — John P. Kong

(57) ABSTRACT

The present invention relates to an apparatus and method for determining operation compatibility between field devices for example, between a first field device and a second field device. The first and second field devices are for use in an industrial process and the second field device may be a candidate for replacing the first field device, the first and second field devices being configured to communicate using the same communications protocol.

25 Claims, 16 Drawing Sheets

| | 301 | 302 | 303 | 304 | 305 | 306 |
|---|---|---|---|---|---|---|
| | First Field Device Manufacturer ID | First Field Device Device Type | First Field Device Device Revision | Second Field Device Manufacturer ID | Second Field Device Device Type | Second Field Device Device Revision |
| 307 | 0x594543 | 0x3 | 0x1 | 0x594543 | 0x3 | * |
| 308 | 0x594543 | 0xc | 0x3 | 0x594543 | 0xd | 0x1-3,6 |
| 309 | 0x37 | 0x4 | 0x2 | 0x37 | 0x4 | 0x2 |
| 310 | 0x31 | 0xc | 0x2 | 0x37 | 0xc | 0x3 |
| 311 | 0x26 | 0x4 | 0x5 | 0x37 | 0xc | 0x6 |

APPARATUS AND METHOD FOR DETERMINING OPERATION COMPATIBILITY BETWEEN FIELD DEVICES

FIELD OF THE INVENTION

The present invention relates to the field of industrial automation. More particularly, the invention relates to an apparatus and method for determining operation compatibility between field devices.

BACKGROUND OF THE INVENTION

Field devices are generally used in a plant for detecting physical quantities such as temperature, pressure and flow rate inside piping; and to transmit the detected signals to control equipment installed at a distant location or to receive signals transmitted from the control equipment. Such field devices may include intelligent field devices with digital communication functions such as for example, Foundation Fieldbus (FF) enabled devices and Highway Addressable Remote Transducer (HART) enabled devices. Foundation Fieldbus and HART are examples of digital communication protocols or standards used in enabling digital data transfer among intelligent field devices. For example, Foundation Fieldbus is a standard defined by the Fieldbus Foundation which defines "Fieldbus" to be a digital, two-way, multi-drop communication link among intelligent measurement and control devices. A Fieldbus serves as a Local Area Network (LAN) for advanced process control, remote input/output and high speed factory automation applications.

In standard maintenance procedures in a plant, field devices may need to be replaced due to device failure, calibration or modifications to include additional functionality. To determine if a new field device is compatible with an existing field device to be replaced, the user first obtains a Device Tag of the existing field device to be replaced and looks for a new field device that has the same Device Tag as the existing field device. A Device Tag is a logical name assigned to an equipment module or control module is assigned or which it implements and may be assigned according to the placement of an equipment module or control module in a plant. If the placement of the equipment module is changed, for instance when the equipment module or control module is replaced, the Device Tag of the replacement or new equipment module will also change. To configure a new field device, it is required to connect a new or a spare field device to the same path or segment where the existing field device was previously connected.

FIG. 1 is a process diagram illustrating a known process 1 for exchanging field devices in an industrial process. The existing field device is removed by a user from a path or segment in step 2 and the new field device is connected to or installed in the path in step 3. A path may refer to a group of process units that are configured in series or parallel and used, or planned to be used in a batch production operation. After physical removal and installation of the existing and new field devices, the user may activate some external tools or applications available from an asset management system 4. The asset management system 4 is a system for managing field devices in real-time. The asset management system 4 may be configured to perform intelligent operations such as, remote access, device parameter management, device diagnostics and tuning for devices that have field communication function including devices compatible with communication protocols including Fieldbus, HART or the like. The asset management system 4 may be configured for enabling devices with or without field communication capability to be registered together for centralized device management. For example, in a device exchange process, the user may access the asset management system 4 to do one of or all of the following device-related tasks to:

1) Configure the new field device in step 5 by modifying the Device Tag and other parameters related to the existing field device;
2) Detect the new field device and register/update its information in step 6 to a database server (not shown) connected to the asset management system 4;
3) Download the existing parameters in step 7 to the new field device;
4) Associate the new and existing field devices by virtue of the new field device inheriting device information of the existing field device in step 8;

After everything has been set and configured, the user uploads the parameters and device information of the new field device in step 9 to the database server. A disadvantage of the above process is that the process relies heavily on the knowledge of the user to remember all the device-related tasks and may not be adequate to complete an exchange of devices in order for the new field device to be operable in the path or an industrial process. Further, heavy reliance on user experience may result in several unintended mistakes if for example, the device exchange process is performed by an untrained operator. Still further, the tasks to be performed on the new field device in order to replace the existing field device could be tedious and confusing because there may be several procedures to be performed on the new field device before the new field device can be operational. As a result, there is tremendous burden on the user who must know each and every method to execute, as well as the proper sequence of the tasks in order to avoid mistakes.

SUMMARY OF THE INVENTION

According to an embodiment, there is an apparatus for determining operation compatibility of a first field device and a second field device, the second field device being a candidate for replacing the first field device in an industrial process, the first and second field devices configured to communicate using the same communications protocol. The apparatus comprises a processor and a memory containing instructions which, when executed under control of the processor, control the apparatus to:

retrieve data relating to the first field device and data relating to the second field device;
perform a compatibility check based on the data relating to the first and second field devices to determine whether the second field device is compatible as a replacement for the first field device in the industrial process; and
generate, for display, on a display, a result of the compatibility check.

The apparatus may be configured, under control of the processor, to perform the compatibility check by performing a first compatibility check including comparing the data of the first field device with the data of the second field device to determine whether the data of the first and second field devices are the same, wherein comparing the data includes comparing model, revision and vendor information relating to the first field device and the second field device.

The apparatus may be configured, under control of the processor to perform the compatibility check by performing a first compatibility check including:

initiating a lookup module providing predetermined combinations of compatible field devices;

comparing the data relating to the first field device and the data relating to the second field device with the predetermined combinations of compatible field devices.

The apparatus may be configured, under control of the processor to perform the compatibility check by:

performing a second compatibility check including initiating a lookup module providing predetermined combinations of compatible field devices; and comparing the data relating to the first field device and data relating to the second field device with the predetermined combinations of compatible field devices.

One of the predetermined combinations of compatible field devices may comprise data different from the data of the second field device, wherein the data includes one of: model, revision and vendor.

The apparatus may be configured, under control of the processor to, prior to retrieving data relating to the first field device and data relating to the second field device, to search for one of a plurality of field devices configured to communicate using the same communications protocol as the second field device, the one of the plurality of field devices being the first field device.

The apparatus may be configured, under control of the processor to:

generate, for display on the display, a result of the compatibility check being that the second field device is compatible with the first field device;

generate, for display on the display, a first user-selectable screen object for requesting one of a plurality of device-related tasks to be performed on the second field device.

The apparatus may be configured, under control of the processor to generate, for display on the display, a second user-selectable screen object for requesting information identifying one or more parameters related to the first field device based on a result of the compatibility check being that the second field device is compatible with the first field device.

The apparatus may be configured, under control of the processor to:

receive a request for information identifying one or more parameters related to the first field device;

retrieve the information identifying one or more parameters related to the first field device from a database server;

generate, for display on the display, the one or more parameters related to the first field device.

The apparatus may be configured, under control of the processor to present a graphical user interface on the display, the graphical user interface being configured to allow the user to select the one or more parameters related to the first field device to be transferred to the second field device.

The apparatus may be configured, under control of the processor to:

receive a request to select the one or more parameters related to the first field device to be transferred to the second field device;

initiate execution of a parameter module for transferring the one or more parameters to the second field device.

The display may be a display of the apparatus or a display of a terminal different from the apparatus.

According to an embodiment, there is a method for determining operation compatibility of a first field device and a second field device, the second field device being a candidate for replacing the first field device in an industrial process, the first and second field devices configured to communicate using the same communications protocol. The method comprises:

retrieving, using a processor, data relating to the first field device and data relating to the second field device;

performing, using the processor, a compatibility check based on the data relating to the first and second devices to determine whether the second field device is compatible as a replacement for the first field device in the industrial process; and generating, using the processor, for display, on a display, a result of the compatibility check.

Performing the compatibility check may include performing a first compatibility check including comparing the data of the first field device with the data of the second field device to determine whether the data of the first and second field devices are the same, wherein comparing the data includes comparing model, revision and vendor information relating to the first field device and the second field device. If a result of the first compatibility check is that the first field device and the second field device is not compatibility, performing the compatibility check may include:

performing a second compatibility check including initiating a lookup module providing predetermined combinations of compatible field devices; and comparing the data relating to the first field device and data relating to the second field device with the predetermined combinations of compatible field devices Alternatively, performing the compatibility check may include performing a first compatibility check including:

initiating a lookup module providing predetermined combinations of compatible field devices;

comparing the data relating to the first field device and the data relating to the second field device with the predetermined combinations of compatible field devices.

One of the predetermined combinations of compatible field devices may have data different from the data of the second field device, wherein the data includes one of: model, revision and vendor.

The method may further comprise, prior to retrieving data relating to the first field device and data relating to the second field device, searching, using a processor, for one of a plurality of field devices configured to communicate using the same communications protocol as the second field device, the one of the plurality of field devices being the first field device.

The method may further comprise:

generating, using the processor, for display on the display, a result of the compatibility check being that the second field device is compatible with the first field device;

generating, using the processor, for display on the display, a first user-selectable screen object for requesting one of a plurality of device-related tasks to be performed on the second field device.

The method may further comprise, using the processor:

generating, for display on the display, a second user-selectable screen object for requesting information identifying one or more parameters related to the first field device based on a result of the compatibility check being that the second field device is compatible with the first field device.

The method may further comprise:

receiving, using the processor, a request to select the one or more parameters related to the first field device to be transferred to the second field device;

retrieving, using the processor, information identifying one or more parameters from a database server based on a result of the compatibility check being that the first field device is compatible with the second field device, the one or more parameters being related to the first field device;

generating, using the processor, for display on the display, the one or more parameters related to the first device.

Generating the one or more parameters may include a graphical user interface on the display, the graphical user interface being configured to allow the user to select the one or more parameters related to the first field device to be transferred to the second field device.

The method may further comprise initiating, using the processor, execution of a parameter module for transferring the one or more parameters to the second field device.

According to an embodiment, there is a machine readable medium, having stored thereon machine readable instructions for executing, in a machine, all the steps of a method comprising: retrieving, using a processor, data relating to the first field device and data relating to the second field device;

performing, using the processor, a compatibility check based on the data relating to the first and second devices to determine whether the second field device is compatible for use in the industrial process that previously uses the first field device; and generating, using the processor, for display, on a display, a result of the compatibility check.

BRIEF DESCRIPTION OF DRAWINGS

Various embodiments of the invention will now be described, by way of example only, and with reference to the accompanying drawings in which:

FIG. 4 illustrates a compatibility look up table comprising predetermined combinations of compatible field devices;

DETAILED DESCRIPTION

As used in this description and in the claims, a "field device" is a device with field communication capability which may be installed in a plant or a factory connected to a higher-order distributed control system through a signal line, and configured to receive or transmit analog signals. For example, "field device" includes devices or modules compatible with Foundation Fieldbus (FF), Highway Addressable Remote Transducer (HART) standards or any suitable standard for enabling digital communication or the like. "first field device" and "second field device" shall be construed accordingly. "second field device" refers to any field device that may be a candidate for replacing the first field device. The term "network" refers to any network suitable for transfer of data in an industrial automation environment. The term "machine-readable medium" refers to any medium that participates in providing instructions to a processor for execution, including without limitation, non-volatile media (e.g. optical or magnetic disks), volatile media (e.g. memory) and transmission media.

Figure 1:
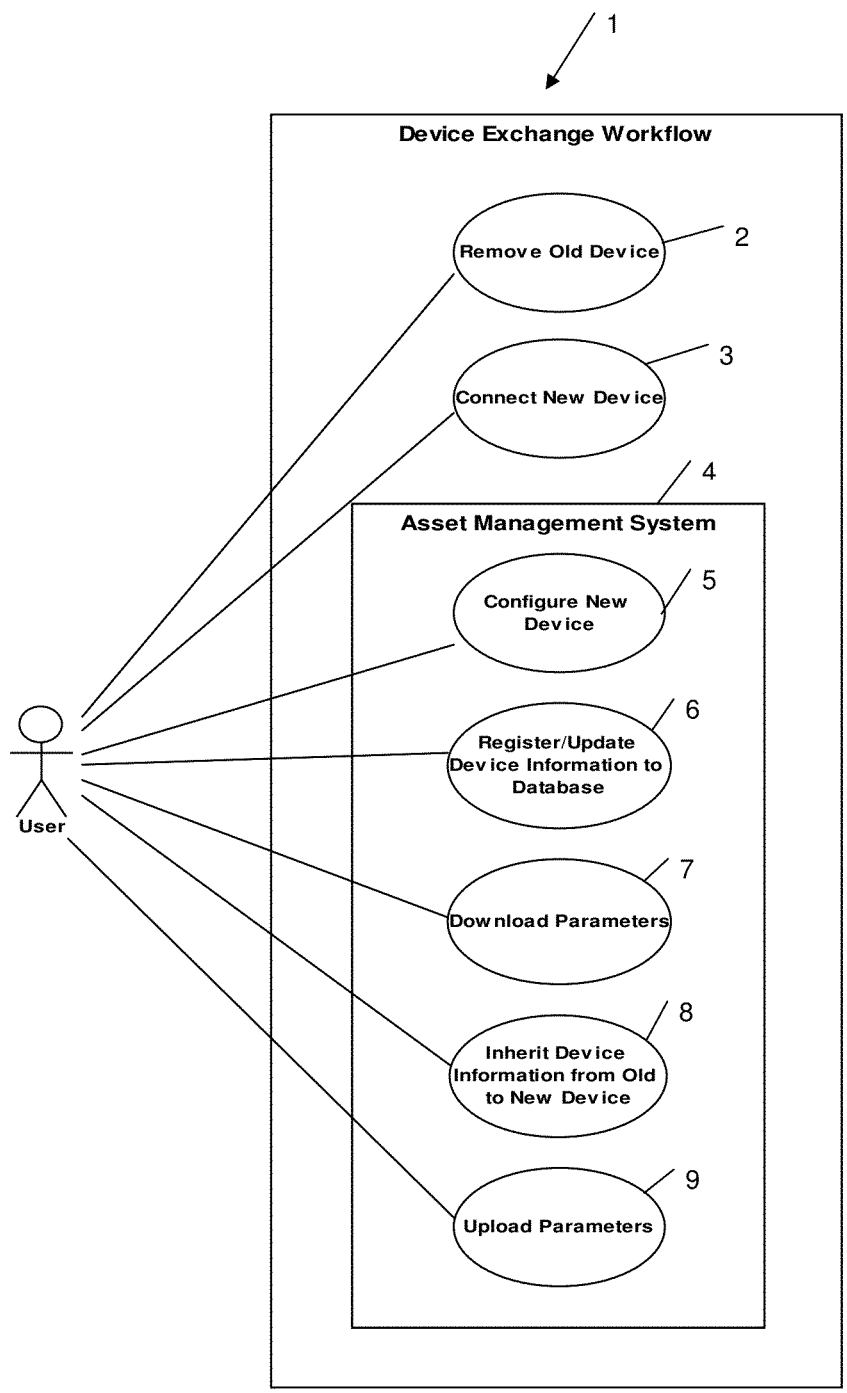
FIG. 1 is a process diagram illustrating a known process for exchanging field devices in an industrial process.
Figure 2:
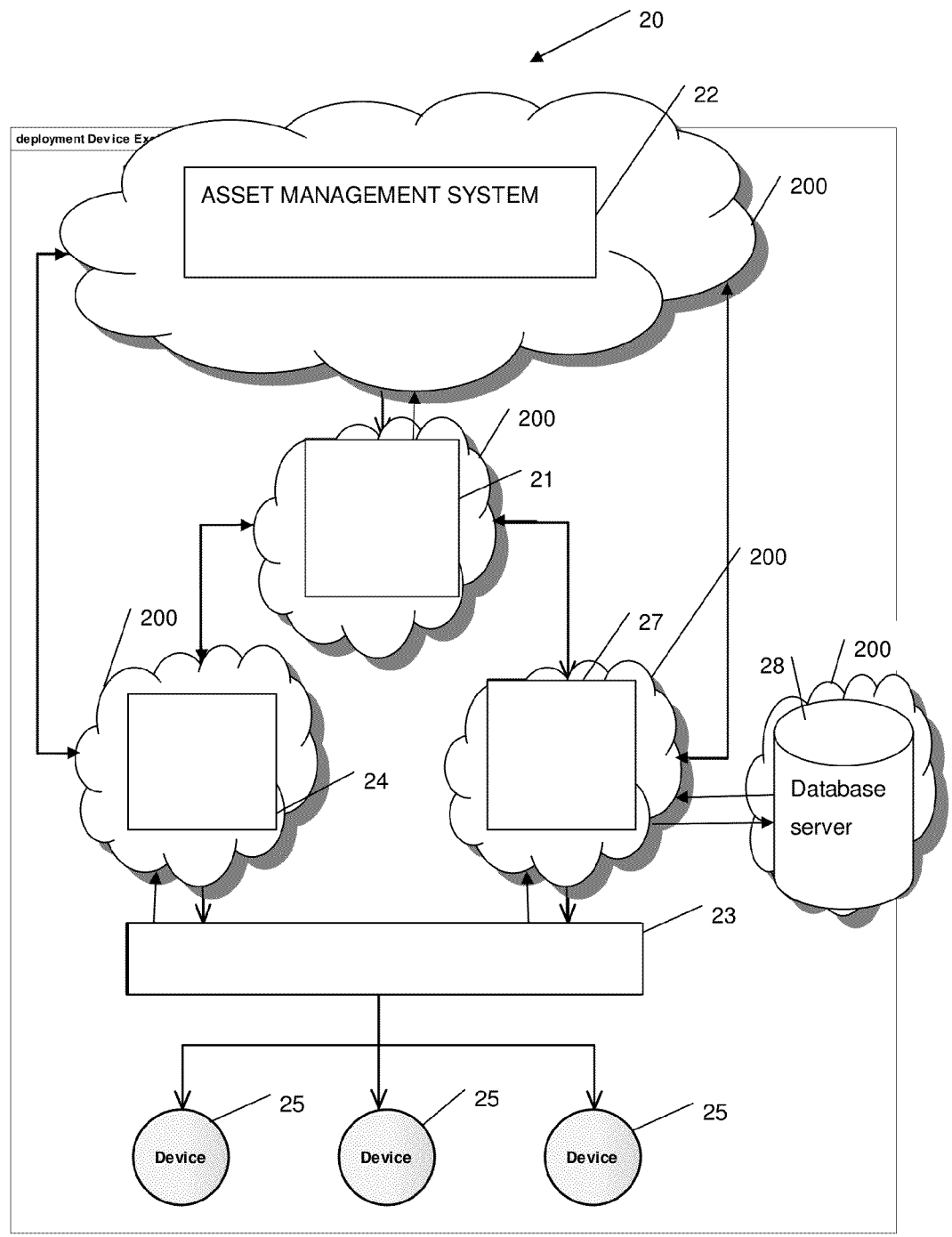
FIG. 2 is a block diagram illustrating a system for managing exchange of field devices over a network.

FIG. 2 is a block diagram illustrating an apparatus 21 for determining operation compatibility of a first field device and a second field device and how it interacts with components in a system 20 for managing exchange of field devices over a network. The system 20 includes the apparatus 21, and an asset management system 22 coupled to the apparatus 21 through a network 200. The network 200 may be a wireless or a wired network and facilitates communication between several components in the system 20. A plurality of field devices 25 may be connected to the apparatus 21 and the asset management system 22 through the network via a gateway 23. The first field device is for use in an industrial process and may be one of the plurality of field devices 25 in use or previously in use in the industrial process. For example, the one of the field devices 25 may be a field device which requires calibration or servicing or tuning or upgrading to include additional functionality. Alternatively, the first field device may be a failed field device or a field device having a status indicated in the asset management system 22 as being operationally not in service (e.g. "Out of Service" or "Off-Service") in an industrial process. Information and data relating to all field devices may be stored in a database server 28 which can be accessed from the asset management system 22 and the apparatus 21 through a database network interface 27.

The second field device may be a candidate for replacing the first field device, and may be selected from the asset management system 22 though a field network interface 24. Upon selection of the second field device and for example, if it is determined by the apparatus 21 that the second field device is compatible with the first field device to be replaced in the industrial process, the apparatus 20 may trigger or invoke a service provided by the field network interface 24 such as downloading/reading of one or more parameters relating to the first field device to the second field device, through the field network interface 24. The parameters may be incorporated in a parameter set as one type of information related to the first field device such as for example, a set of parameter values related to the first field device. It will be appreciated that the parameter set may contain information different from device information details such as Device ID, Device Tag, calibration data or the like. For example, the downloading of the parameters from the first field device to the second field device may be in a data transfer format such as a class library (.dll) or API form (e.g., web/windows service Windows Communication Foundation (WCF), or the like). Further, process operation information, device diagnostic information and other information relating to the second field device may be transmitted to the asset management system 22 via the field network interface 24. The apparatus 21 is not directly connected to the first field device or any field device and the database server. All the configurations to the new field device and the database server are done by the interfaces 24, 27 and not by the apparatus 21 as the apparatus 21 only invoke or trigger the services associated with the two interfaces 24, 27. In an embodiment, the functions to be executed by the apparatus 21 may be configured. For example, all the services to be invoked or triggered by the apparatus 21 may be placed in a configurable file like xml, csv, txt, or the like, or in a database such a content server connected to the network. For example, the method name, web service address (if function is exposed as a web service), parameters and other required information should be put in the configurable file and all methods must be arranged accordingly. If there are changes to make in the 'Download/Upload' operations like renaming, removing and/or arranging the functions, the file may be configured accordingly.

Figure 3:
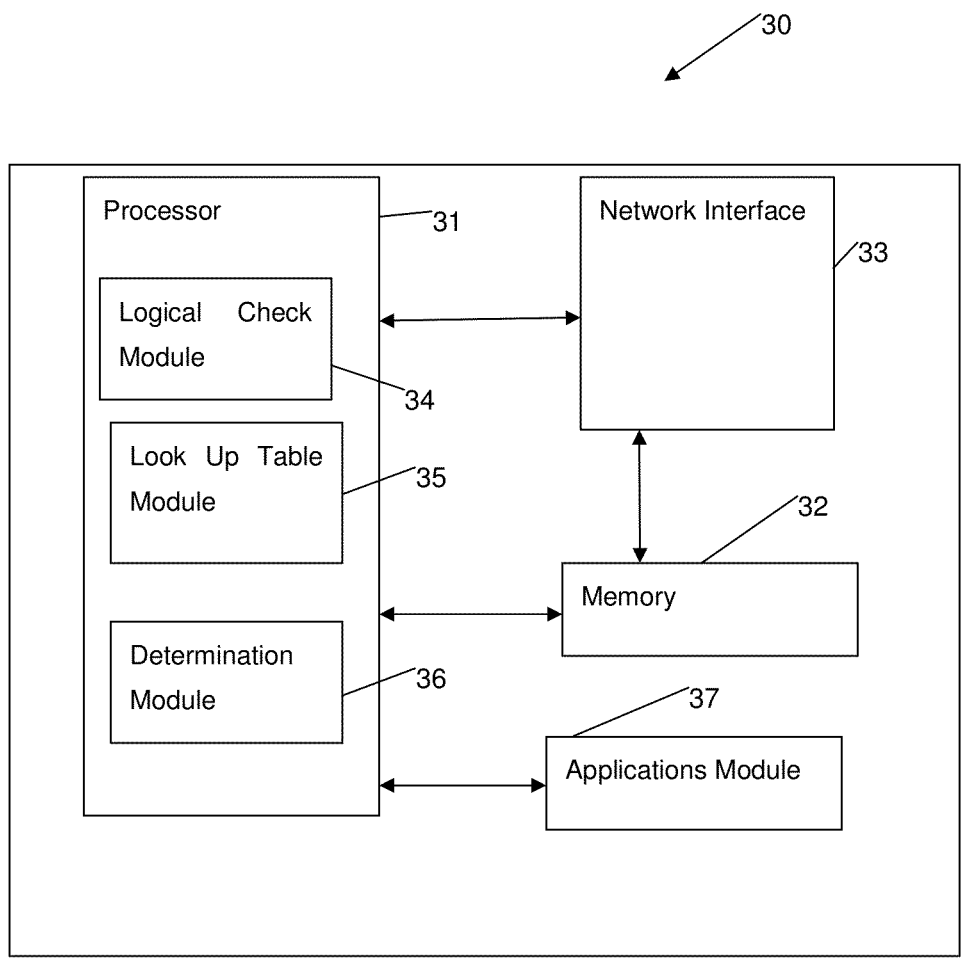
FIG. 3 is a block diagram illustrating an apparatus for determining operation compatibility of a first field device and a second field device.

FIG. 3 is a block diagram of the apparatus 21 for determining operation compatibility of a first field device and a second field device. Although the architecture of the apparatus 21 is typical of a computing device (e.g. a computer), the disclosed implementations may be realized in any device capable of presenting a user interface on a display device, including but not limited to: desk top or portable computers, servers, databases, electronic devices or the like. The apparatus 21 comprises a processor 31, a memory 32, a network interface 33 configured to receive and send data over the network. In an embodiment, the apparatus 21 may include an applications module 37 having one or more applications to provide instructions to generate a user interface, e.g. a graphical user interface (GUI), to enable device parameter selection features or the like. The memory 32 contains instructions which, when executed under control of the processor 31, control the apparatus 21 to retrieve data relating to the first field device and data relating to the second field device perform a compatibility check based on the data relating to the first and second field devices to determine whether the second field device is compatible for use in the industrial process that previously used the first field device; and generate, for display, on a display, a result of the compatibility check. The processor 31 comprises a logical check module 34, a look up table module 35, and a determination module 36. In an embodiment, the memory 32 may be used to temporarily store a compatibility look up table having predetermined combinations of compatible field devices. An exemplary compatibility look up table having the predetermined combinations of compatible field devices will be described in greater detail with reference to FIG. 4.

Data relating to the first and second field devices may include field device details related to one of: Device Tag, Device ID, Device Address, Communication Type, Vendor, Model, Device Revision, and Device Class. Such data may be retrieved by the logical check module 34 and the look up table module 34 and used as compatibility check items by the determination module 36 to determine compatibility of the first and second field devices.

In an embodiment, when the apparatus 31 receives a request for determining compatibility of a first field device and a second field device in response to interaction with an user selectable screen object associated with initiating a method for determining compatibility of the first and second field devices, the logical check module 34 retrieves the Vendor, Model and Device Revision data for each of the first and second field devices. The determination module 36 may determine compatibility of the first and second field devices by comparing the Model, Device Revision and Vendor data relating to each of the first field device and the second field device.

If it is determined by the determination module 36 that the Model, Device Revision and Vendor data of the first and second field devices match or are identical, the apparatus 21 may be configured to generate a user-selectable screen object to enable user interaction to initiate a task module (not shown) for performing one or more device-related tasks on the second field device.

Alternatively, if the determination module 36 determines that the Model, Device Revision and Vendor data of the first and second field devices are not the same, i.e. not compatible or logically incompatible, the processor 31 invokes the look up table module 35 which obtains the compatibility look up table from the memory 32. The determination module 36 then performs a comparison in the compatibility look-up table based on the data related to the first and second field devices including a Manufacturer ID, a Device Revision and a Device Type data of the first and second field devices. The Manufacturer ID refers to an identifier code of the vendor of the field device and may be obtained or derived from the Device ID of the field device. The Device Revision refers to the revision number of the field device and the Device Type is a model of the field device.

Figure 10:
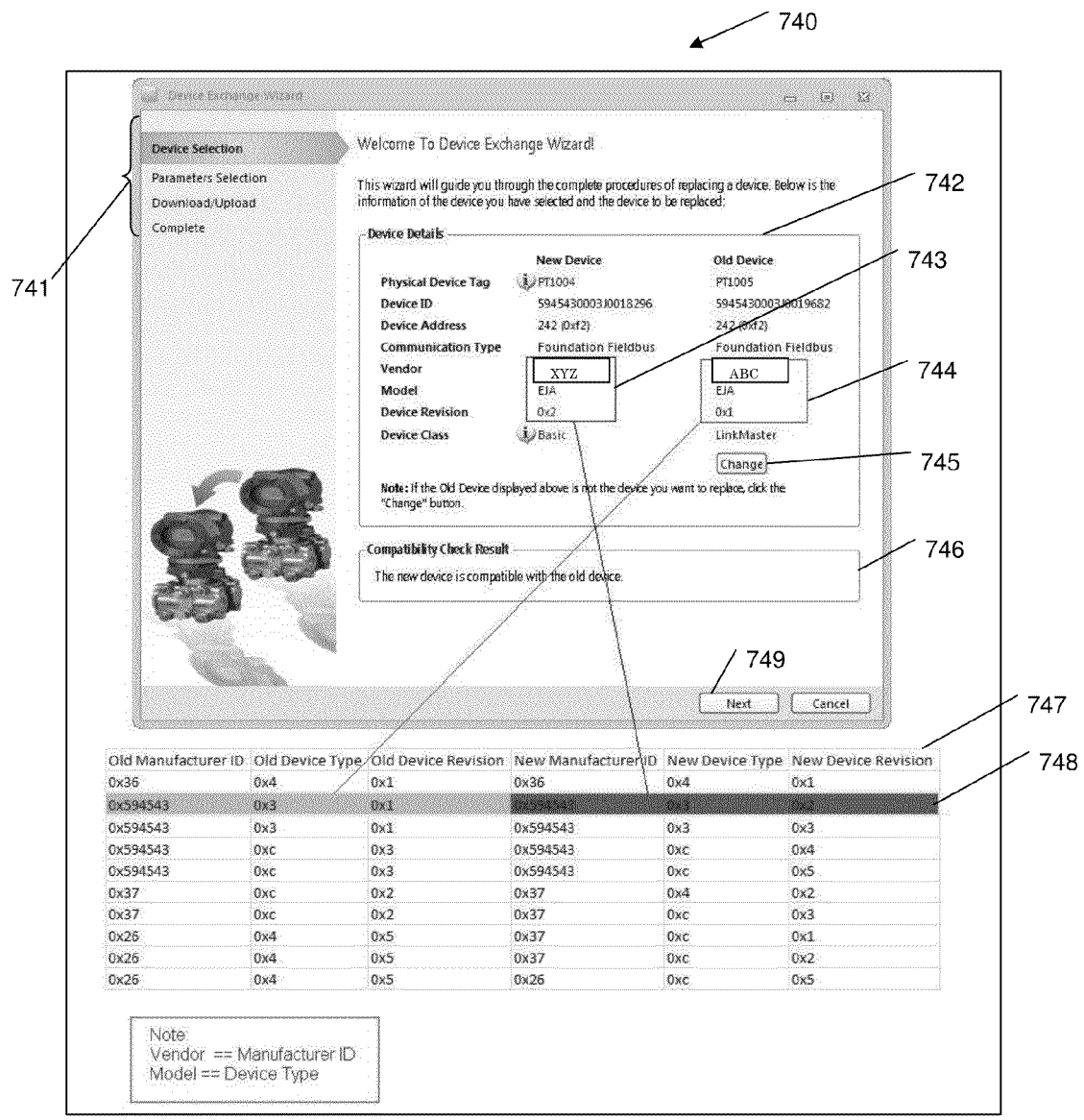
FIG. 10 is a screen shot illustrating an exemplary user interface for performing a compatibility check of field devices.

For example, a first six digits or a first set of digits in the Device ID may be obtained from the retrieved data related to the first and second field devices and used for the comparison to determine compatibility of the first and second field devices. If the determination module 36 determines that there is a predetermined combination of compatible field devices based on the data related to the first and second field devices, the apparatus 21 generates for display, a result of the compatibility check based on the look up module being that the first and second field devices are compatible. The result of the compatibility check is also displayed in the 'Compatibility Check Result' in the Device Selection step as shown in FIG. 10. The only identification that the devices are 'logically incompatible but look-up table compatible' is the difference between a font color of a compatibility check item (vendor, model, revision) of the second field device having a different value from a compatibility check item of the first field device's. For example, if the first and second field devices are determined by the determination module 36 to be compatible but a value of the device revision is different, the font colour of the device revision of the second field device will be indicated in a colour different from the font colour of the other compatibility check items of the second field device.

The apparatus 21 may be configured to generate a user-selectable screen object to enable user interaction to initiate the task module (not shown) for performing one or more device-related tasks on the second field device. Still further, the apparatus 21 may be configured, under control of the processor 31 to search for a plurality of field devices configured to communicate using the same communications protocol as the second field device and generate for display, data related to one of the plurality of field devices as data of the first field device, wherein the first field device is one of the plurality of field devices. The plurality of field devices may include field devices disconnected from the network ("disconnected field devices") or field devices connected to the network. The first record, i.e. data relating to one of the plurality of field devices is retrieved by the apparatus 21 and may be displayed on a display as a default first field device. The apparatus 21 may be configured to generate, prior to retrieving data relating to the first field device, for display on the display, the data relating to the plurality of field devices and a user-selectable screen object for the selection of the first field device based on the data relating to the plurality of field devices. Therefore, if the default first field device is not a field device which the user wants to replace, the user may select another first field device to be replaced from the data related to the plurality of field devices retrieved by the apparatus 21 and the data relating to the selected first field device will be retrieved in response to a user request of the selected first field device.

The apparatus 21 may be configured under control of the processor 31 to perform the compatibility check by performing a first compatibility check including comparing the data of the first field device with the data of the second field device to determine whether the data of the first and second field devices are the same. Comparing the data may include comparing model, revision and vendor information relating to the first field device and the second field device.

To perform a first compatibility check, the apparatus 21 may initiate a lookup module providing predetermined combinations of compatible field devices and perform a comparison of the data relating to the first field device and the data relating to the second field device with the predetermined combinations of compatible field devices. If a result of the first compatibility check is that the data of the first and second field devices are not compatible, the apparatus 21 proceeds to perform a second compatibility check which includes initiating a lookup table module providing predetermined combinations of compatible field devices. The data relating to the first field device and data relating to the second field device is then compared with the predetermined combinations of compatible field devices.

If a result of the compatibility check is that the second field device is compatible with the first field device, the apparatus 21 may be configured to generate, for display on the display, a first user-selectable screen object for requesting one of a plurality of device-related tasks to be performed on the second field device. It will be appreciated that the compatibility check can include the first compatibility check only or the first and second compatibility checks. Therefore, the generation of a result of the compatibility check depends on the first or second compatibility check performed. For example, if a result of the first compatibility check is that the second field device and the first field device are not compatible, the result of the first compatibility check will not be displayed as the apparatus 21 will perform the second compatibility check before generating for display, a result of the compatibility check or the second compatibility check.

The apparatus 21 may also be configured, under control of the processor 31 to:
generate, for display on the display, a second user-selectable screen object for requesting information identifying one or more parameters related to the first field device based on a result of the compatibility check being that the second field device is compatible with the first field device.

The apparatus 21 may also be configured, under control of the processor 31 to:
receive a request for information identifying one or more parameters related to the first field device;
retrieve the information identifying one or more parameters related to the first field device from a database server;
generate, for display on the display, the one or more parameters related to the first field device.

The apparatus 21 may be configured, under control of the processor 31, to present a graphical user interface on the display, the graphical user interface being configured to allow the user to select the one or more parameters related to the first field device to be transferred to the second field device. The apparatus 21 may be configured, under control of the processor 31 to: receive a request to select the one or more parameters related to the first field device to be transferred to the second field device; and initiate execution of a parameter module for transferring the one or more parameters to the second field device.

The apparatus 21 may also connected to a display for displaying data relating to the first and second field devices and the result of the compatibility check. It will be appreciated that the display for displaying the compatibility result and the data of the first and second field devices may be a display of the apparatus or a display of a terminal different from the apparatus. For example, a user may request for the apparatus to determine compatibility of the first and second field devices from a server or a terminal but the compatibility result and the device information may be displayed to operators in the plant on a display device different from the terminal determining the compatibility of the field devices.

FIG. 4 illustrates an exemplary compatibility lookup table 300 for performing a compatibility check of the second field device. The compatibility look-up table 300 contains different combinations of compatible field devices based on details relating to vendor (manufacturer_ID 301, 304), model (device_type 302, 305) and revision (device revision 303, 306). A manufacturer ID refers to an identifier code of the vendor of the field device which is assigned to a field device when a field device is manufactured. In an embodiment, the table 300 may be stored in a csv (comma-separated values) file which may be stored in the memory 32. The table 300 is used by the apparatus 21 to perform a second compatibility check to re-evaluate the devices' compatibility if the first compatibility check, i.e. logical check is not satisfied. The table 300 may be incorporated in the apparatus 21 as part of the Device Exchange Wizard package and may be accessible to the user upon initiating the apparatus 21. If this file is deleted, the apparatus 21 may not proceed to generate a result of the compatibility check. Each record or row 307, 308, 309, 310, 311 is related to one combination of compatible field devices. However, the user may use wildcards in all columns to represent shortcuts and exclusions so as to inhibit repetition of data. Wildcards include '*' (asterisk) to signify that any values are valid; and ',' (comma) and '—' (dash) for range of values and data elimination. In an embodiment, the present invention could be designed to be ported to different platforms and environment. Also, the compatibility look up table may be configured in a file which may be encrypted or configured to allow authorised personnel to control data or parameters or combinations of compatible field devices in the table and to prevent unauthorized users from modifying or altering the table.

An advantage of performing a compatibility check using the look up table 300 is that even if the first and second field devices do not have the same vendor, model and/or revision, the second field device could be compatible with the first field device if there is a predetermined combination of compatible devices in the look up table. An example of which are devices that are backward compatible or those that can replace old versions of them. By backward compatible, it is meant to include devices which work with input generated by earlier or older revisions of field devices.

Figure 5:
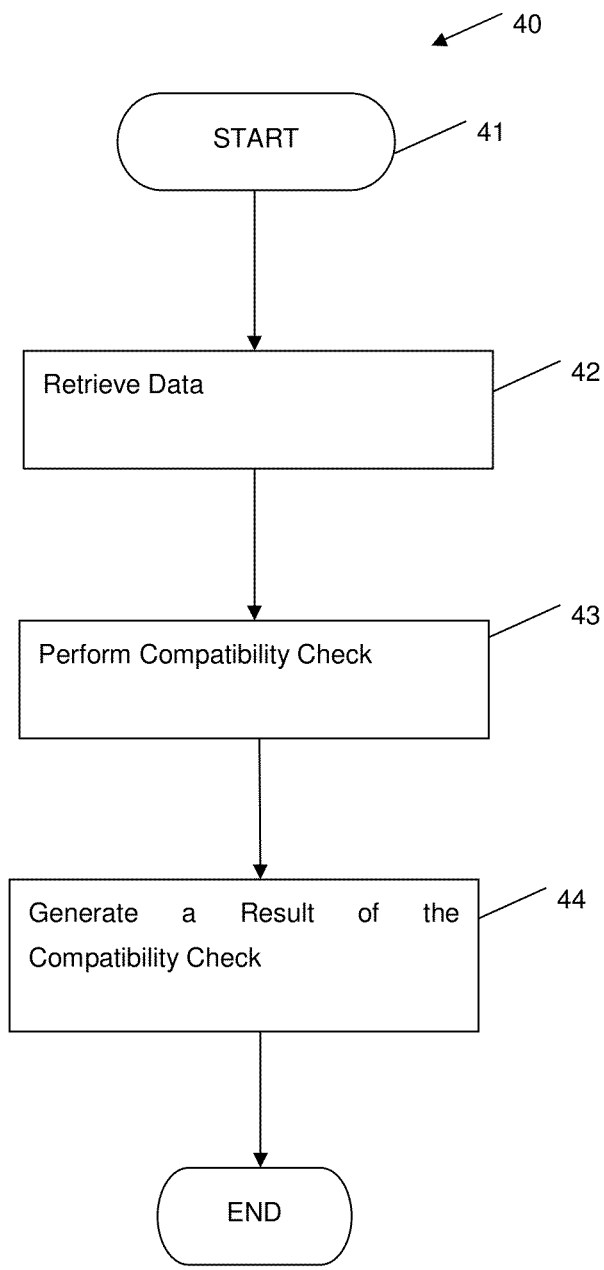
FIG. 5 is a flow chart illustrating a method for determining operation compatibility of a first field device and a second field device.

A method 40 for determining operation compatibility of a first field device and a second field device will be described in greater detail with reference to FIG. 2 and FIG. 5. The method 40 starts at step 41 by for example, a user selecting a second field device from the asset management system 22. The second field device may be a spare field device or a recent purchased field device. The second field device may or may not be connected to a network but the second field device is located in the asset management system 22. Information and data relating to the second field device stored in the database server (not shown) is retrieved by the apparatus 21 in step 32 from the database server via the interface 27. Alternatively, if the information and data relating to the second field device has not been stored or registered in the database server, the apparatus 21 may retrieve the information and data by accessing the second field device via the interface 24. Information and data relating to a first field device stored in the database is also retrieved by the apparatus 21 in step 32 from the database server via the interface 27. For example, the apparatus 21 may be configured to retrieve data relating to a plurality of field devices configured to communicate using the same communications protocol as the second field device. For example, the apparatus 21 may be configured to search for disconnected field devices. If no disconnected field devices are found, the apparatus 21 may search for all field devices that have the same communication type as the second field device and then generate, for display on a display, a first or the only record relating to the default first field device and a user-selectable screen object for the selection of tone of the plurality of field devices as the first field device. Therefore, depending on the retrieved data relating to the plurality of field devices, the user may select the first field device based on one of a plurality of field devices being disconnected from the network or another one of a plurality of field devices being connected to the network. If the first field device displayed in the apparatus is the field device to be replaced or exchanged but the compatibility result show that the first and second field devices are not compatible, the user may not just change or replace the first field device with the second field device because incorrect device parameters and information may be downloaded to the second field device. To prevent incorrect device parameters and information from being downloaded to the second field device, the user selectable screen object "NEXT" as shown in FIG. 9B, cannot be selected by the user.

To determine whether the second field device is compatible for use in the industrial process that previously uses the first field device, the apparatus 21 performs a compatibility check at step 33 based on the data relating to the first and second field devices and generates, for display, on a display, a result of the compatibility check at step 34.

Figure 6:
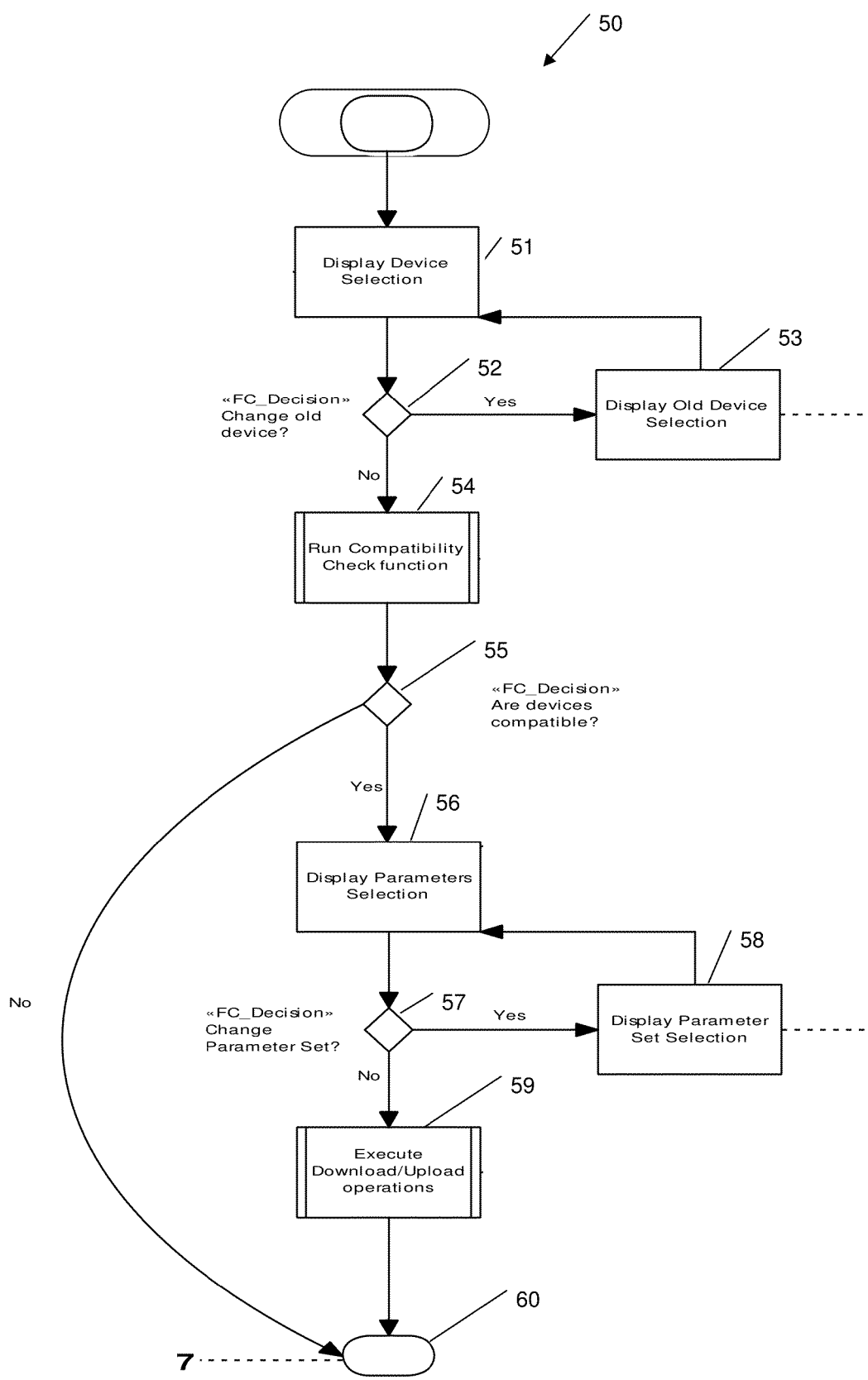
FIG. 6 is a detailed flow chart illustrating a method for determining operation compatibility of a first field device and a second field device and operations for invoking applications to configure the second field device to replace the first field device.

FIG. 6 is a detailed flow chart illustrating a method 50 for determining operation compatibility of a first field device and a second field device and operations for invoking applications to configure the second field device to replace the first field device. The method 50 may be initiated from the asset management system 22, and the apparatus 21 may be configured to generate, for display, a Device Selection page in step 51. If it is determined in step 52 that the default first field device is not the field device to be replaced, the user may go to the Device Selection page in step 53 and select from a list of field devices to select a first field device to be replaced by the second field device. The method 50 may include a compatibility check function in step 54 to be run or executed every time the Wizard is launched or the first field device is changed by the user. If it is determined in a compatibility check in step 54 that the compatibility result is not valid, the user cannot continue with field device exchange and the method 50 ends in step 60. If it is determined in step 55 that the first and second field devices are compatible, the user can go to the Parameters Selection page in step 56. The user may determine in step 57 whether a parameter set of the second field device should be changed. If the user wants to change the parameter set, he may go to the parameter set selection page in step 58 where the device parameters of the first field device to be copied to the second field device are listed as shown in an interface 714 of FIG. 9D. All the functions or device-related tasks for configuring the second field device are then retrieved by the apparatus to configure the second field device in step 59 and to register with the database server. The progress as well as the result of a device-related task may be displayed on a display, in step 59, for example, in a 'Download/Upload' page as shown in FIG. 9F.

Figure 7:
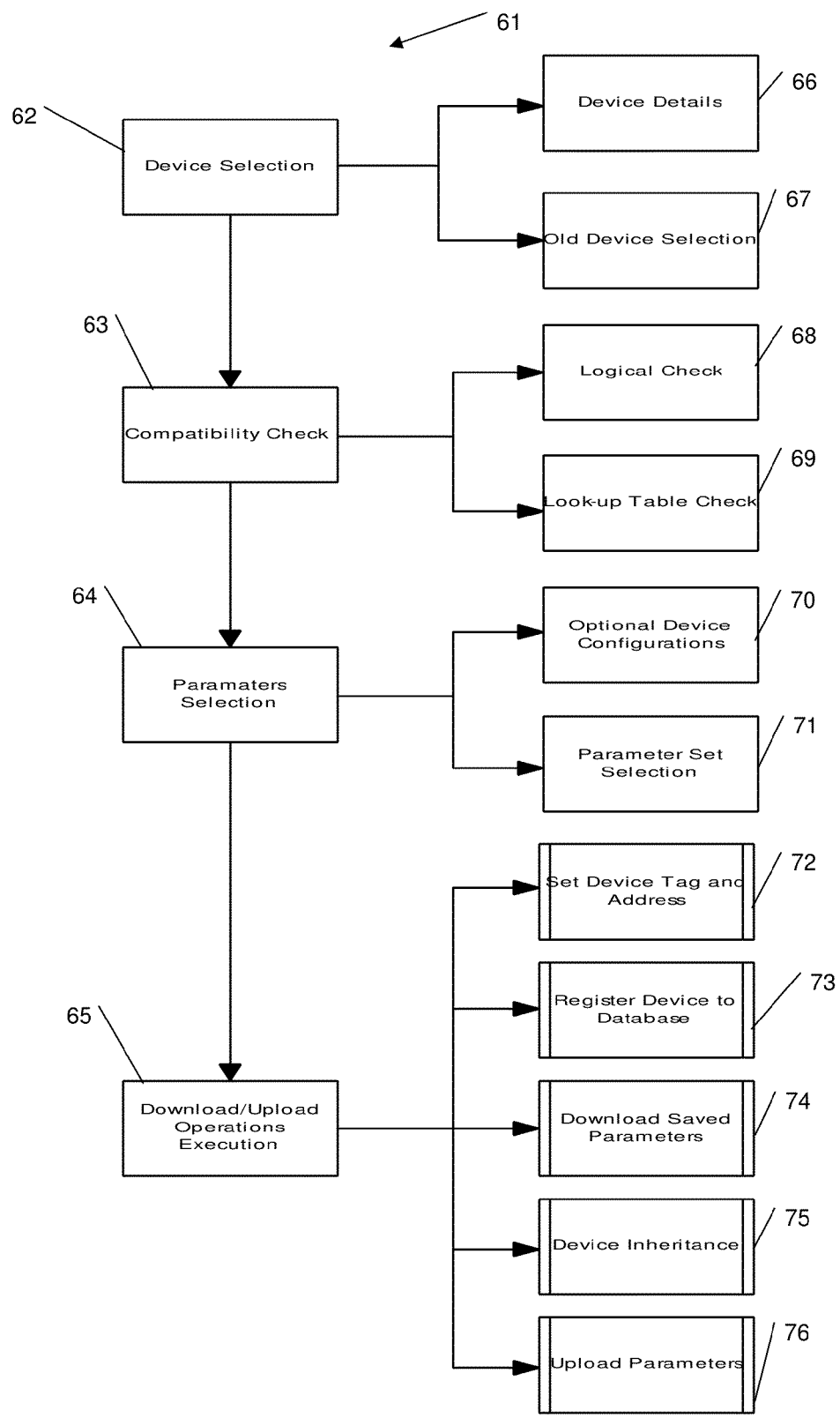
FIG. 7 is a detailed flow chart illustrating method operations performed in configuring a second field device to replace a first field device.

FIG. 7 is a detailed flow chart illustrating a method 61 for determining compatibility of a first first device and a second field device and for performing operation steps for configuring a second field device to replace a first field device. The Device Selection displays in step 62 the information 66 of the first field device and the second field device as a replacement for the first field device in an industrial process. The second field device is a field device selected by the user from the asset management system. In an embodiment, the apparatus may be configured to search for disconnected field device/s or if no disconnected first field devices are found, it will retrieve all field devices that have the same communication type as the second field device and then show the first or the only record as the default first field device. Therefore, a user may select one of the plurality of field devices as the first field device in step 67 if the default first field device is not the first field device to be replaced. In an embodiment, it will be appreciated that the apparatus 21 will generate a user selectable screen object for selection of the first field device regardless of whether the default record of the first field device generated for display on the display is the target or desired first field device which the user wants. Therefore, the user has the option of selecting another field device from a plurality of field devices searched by the apparatus 21 as the first field device.

Compatibility check of second and first field devices may be performed in step 63 to check whether the second device can replace the first field device by a logical check in step 68 based on comparing the field devices' vendor, model and revision. If a logical check result in step 68 show that the first and second field devices are not logically compatible in a first compatibility check, a second compatibility check is performed by the apparatus 21 using the compatibility look-up table in a look-up table check in step 69 to determine if the first and second field devices are compatible. The compatibility look-up table may be a matrix or an array of devices showing the different combinations of vendor, model and revision of compatible field devices as shown in a look up table 300 in FIG. 4.

If the first and second field devices are deemed to be compatible in step 63 based on the first compatibility check or the first and second compatibility checks, the Parameters Selection page, on the other hand hosts the default parameter set to be downloaded to the physical (second) device may be generated for display by the apparatus 21 in step 64. Other prerequisites and/or optional device configuration/s can also be seen in this page in step 70. Alternatively, the parameter set can also be changed by navigating to the Parameter Set Selection page in step 71. Parameters Selection is like a pre-exchange field device configuration function because it allows the user to select a parameter set to be used to configure the second field device. Optionally, the user may choose to defer uploading of the selected parameter set to the second field device.

All functions or task information related to configuration of a second field device are invoked and executed in the Download/Upload page in step 65. Some of the common and predefined processes or steps related to device-related tasks for configuring a second field device for replacing a first field device may include one of:

Step 72—Set Device Tag and Address
Step 73—Register Device to Database
Step 74—Download Saved Parameters
Step 75—Device Inheritance
Step 76—Upload Parameters.

Additional methods relating to a specific type of device can also be found in Step 76.

In an embodiment, the methods 40, 50, 61 may be encoded in a software platform as a field device exchange program configured to execute steps according to the method 40. For example, the method 40 may be encoded in a program referred to as a Device Exchange Wizard (hereinafter, "Wizard") executable from the asset management system 22. The apparatus 21 may be configured, under control of the processor 31 to generate user screen interfaces such as navigation buttons and may consists of different screens/pages to guide users to perform steps in the method 40.

Figure 8:
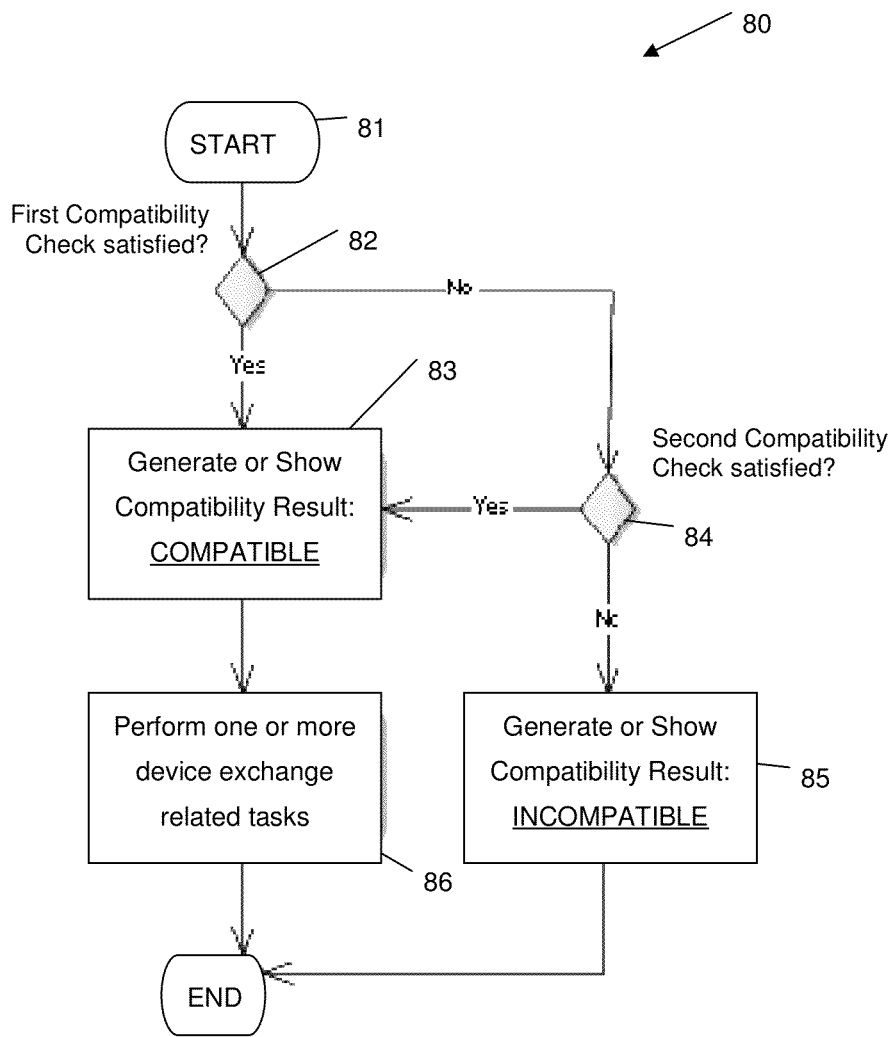
FIG. 8 is a flow chart illustrating method operations performed for determining operation compatibility between a first field device and a second field device.

FIG. 8 is a method 80 for determining operation compatibility of a first field device and a second field device. The method 80 begins in step 81 by performing a first compatibility check including comparing the data of the first field device with the data of the second field device to determine whether the data of the first and second field devices are the same, wherein comparing the data includes comparing model, revision and vendor information relating to the first field device and the second field device. In step 82, it is determined whether the first compatibility check indicates that the first field device and the second field device are compatible. If the apparatus determines based on a result of the first compatibility check that the first field device and the second field device are not compatible, the apparatus proceeds in step 84 to perform a second compatibility check including initiating a lookup module providing predetermined combinations of compatible field devices; and comparing the data relating to the first field device and data relating to the second field device with the predetermined combinations of compatible field devices. If a result of the second compatibility check in step 84 indicates that the second field device is compatible with the first field device, the apparatus generates in step 83, for display on the display, a compatibility result that the first and second field devices are compatible and in step 86, generates for display on the display, a first user-selectable screen object for requesting one of a plurality of device-related tasks to be performed on the second field device based on the result of the compatibility check. Similarly, if a result of the first compatibility check in step 82 indicates that the first and second field devices are compatible, the apparatus generates in step 83, for display on the display, a compatibility result that the first and second field devices are compatible and the apparatus proceeds to perform the device related tasks upon selection of the first user-selectable screen object by the user.

However, if the apparatus determines in step 84 that the first and second field devices are incompatible in that there are no predetermined combinations found in the look up table which relates to the first and second field devices, then the apparatus generates in step 85, for display on the display, a compatibility result that the first and second field devices are not compatible and the device exchange process may be terminated by the user. Upon interaction with a user selectable screen object, the apparatus may then initiate an application or a task module to perform device related operations related to configuring the second field device for replacing the first field device in step 86.

FIG. 9A to FIG. 9G are screen shots illustrating an exemplary user interface for implementing a method for determining operation compatibility of a first field device for use in an industrial process and a second field device according to an embodiment. The method may be programmed using Microsoft's Windows Workflow Foundation (WF) so as to encompass the entire device exchange process including removing and installing of devices. Workflow Foundation is a technology to implement procedures ranging from human to system interactions.

Figure 9A:
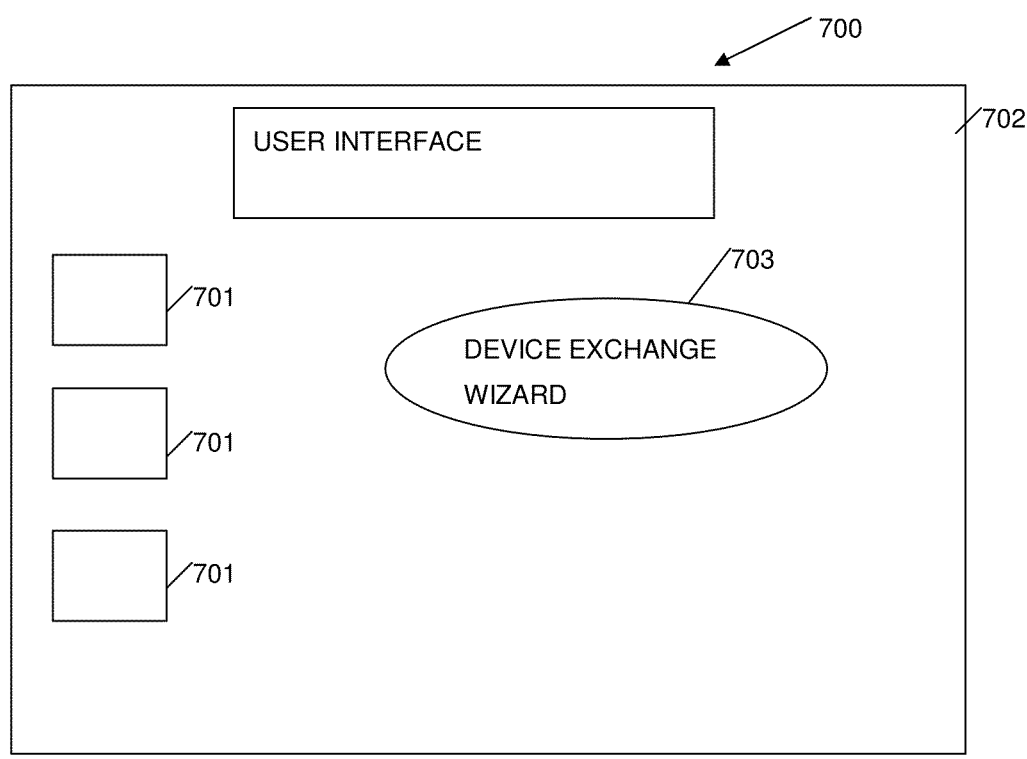
FIG. 9A is a illustration of an exemplary user interface displaying a user selectable screen object for implementing method for determining operation compatibility between field devices.
Figure 9B:
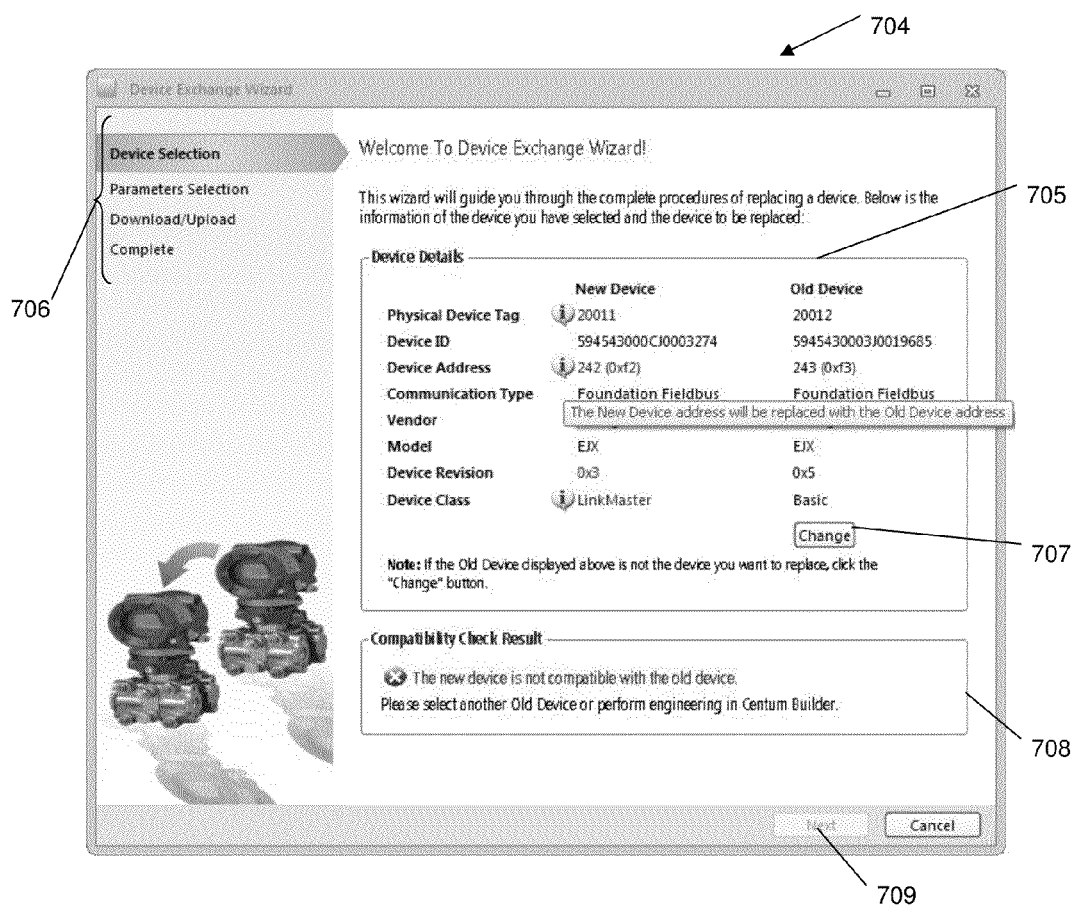
FIG. 9B is an illustration of an exemplary user interface for determining operation compatibility between field devices.

FIG. 9A is an illustration of a user interface 700 for implementing a method for determining operation compatibility of a first field device for use in an industrial process and a second field device according to an embodiment. The user interface 700 enables a user to interact with the apparatus 21 and may be implemented using, for example, a device exchange wizard application that displays a sequential set of graphical user interface screens providing a step-by-step process to guide a user in selecting or defining desired parameters for configuring a second field device to replace a first field device. The user interface 700 may include icons 701, an application window 702, and clicking on a Device Exchange Wizard icon 703 to invoke the device exchange wizard application.

FIG. 9B is an illustration of an exemplary user interface 704 for determining operation compatibility between field devices in response to interaction with an application. The user interface 704 includes displays information of a second field device selected from the asset management system and selection of a first field device. A menu list view 706 on the user interface 704 lists the steps of replacing an existing field device (first field device) with a new field device (second field device). A device details area 705 lists data related to the first and second field devices including but not limited to the physical device tag names, device ID, device address, communication type, vendor, model, device revision and device class. If the apparatus determines that the vendor, model and revision of first and second field devices are not the same and based from the compatibility look-up table/file the field devices are still not compatible, the user cannot proceed with the device exchange as seen in a compatibility check result feature 708. However, the user may change the first field device using a change feature 707 to select another one of a plurality of field devices if the first field device displayed in the device details area 705 is not the field device to be replaced.

Figure 9C:
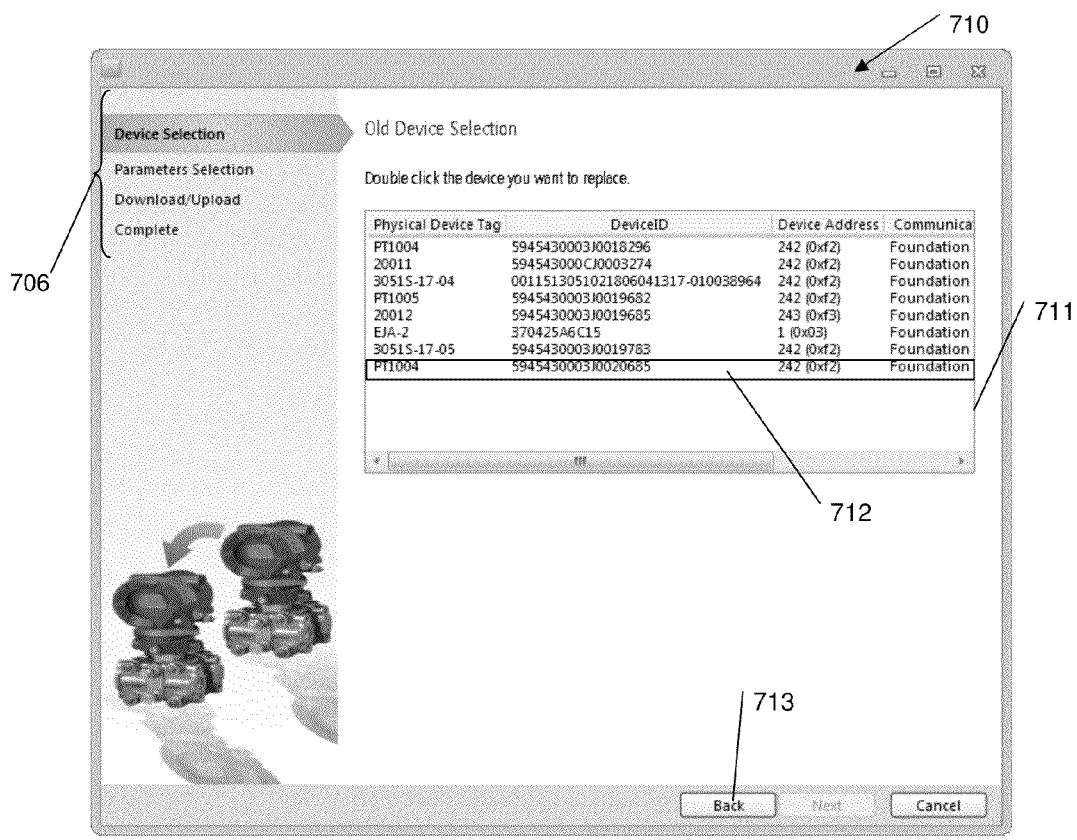
FIG. 9C is a screen shot illustrating a "Device Selection" view of an exemplary user interface in response to interaction with a screen object.

FIG. 9C is a screen shot illustrating a "Device Selection" view of an exemplary user interface 710 in response to interaction with a screen object. The user interface 710 ("Old Device selection page") displaying a search results area 711 that lists field device identifier codes generated for a plurality of field devices located in the asset management system which are searched by the apparatus based on the same communication type. The plurality of field devices may include all the disconnected field devices and/or the field devices in the field network with the same communication type as the second field device. If the default first field device displayed in the devices details area 705 is not the field device to be replaced, the user may double click on any one of the plurality of field devices displayed in the search results area 711 to select one of the plurality of field devices (for example, data row 712) as the first field device. After the first field device has been selected, the user is redirected or navigated to the user interface 705 in FIG. 9B and the devices details area 705 is updated to indicate the selected one of the plurality of field devices as the first field device and to display a compatibility result data of the first field device selected by the user and the second field device. A back function feature 713 may also be used by the user to return to the user interface 705 if the user does not wish to change the first field device.

Figure 9D:
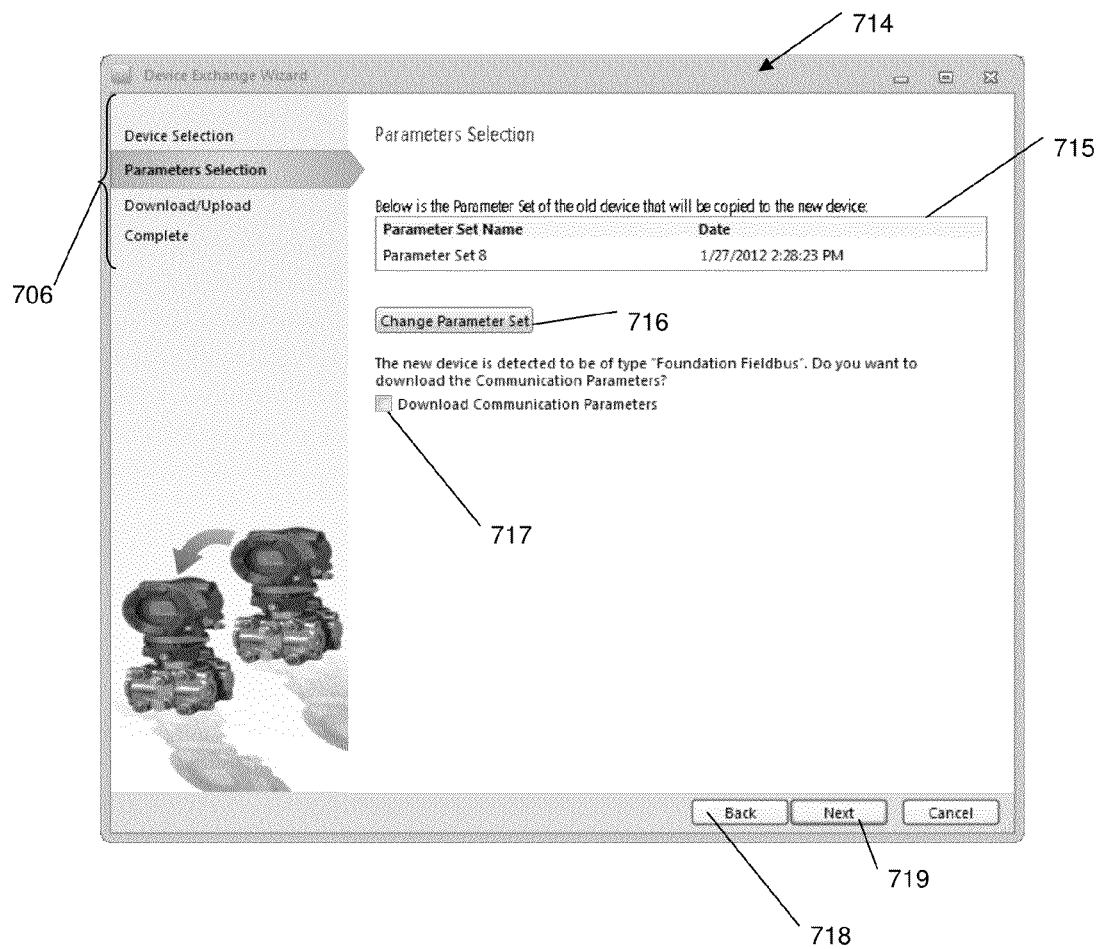
FIG. 9D is a screen shot illustrating a "Parameters Selection" view of an exemplary user interface in response to interaction with a screen object.
Figure 9E:
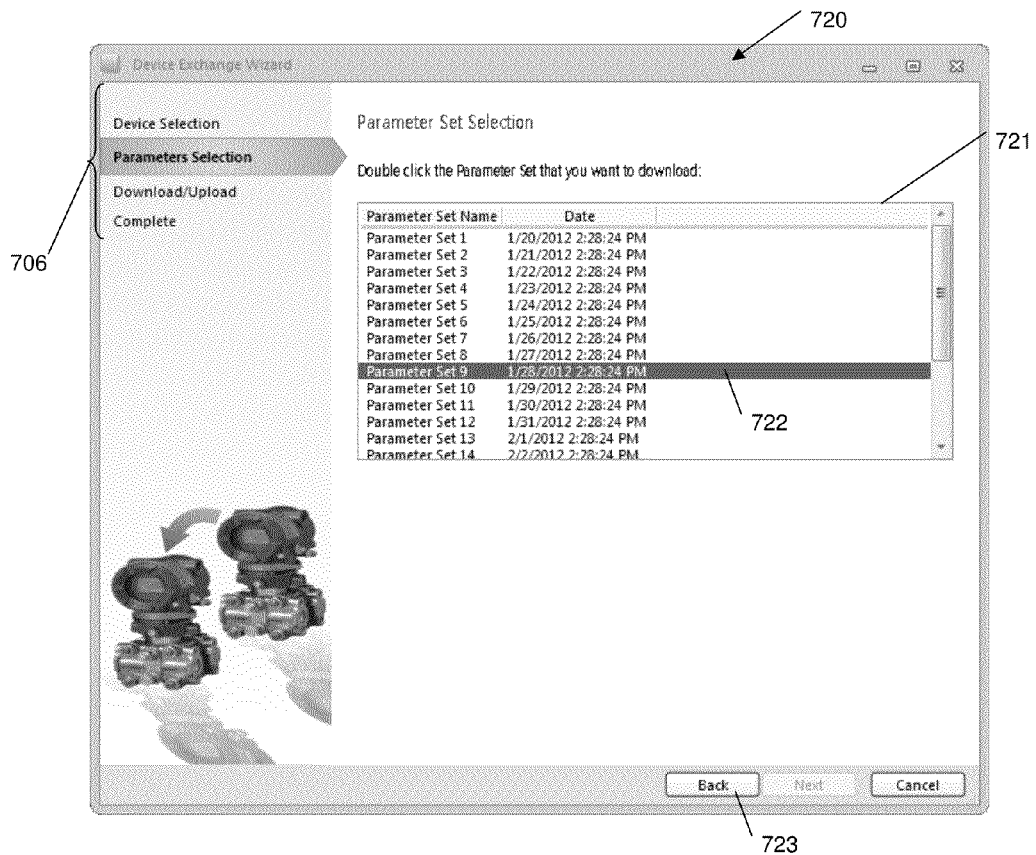
FIG. 9E is a screen shot illustrating a "Parameters Set Selection" view of an exemplary user interface in response to interaction with a screen object.
Figure 9F:
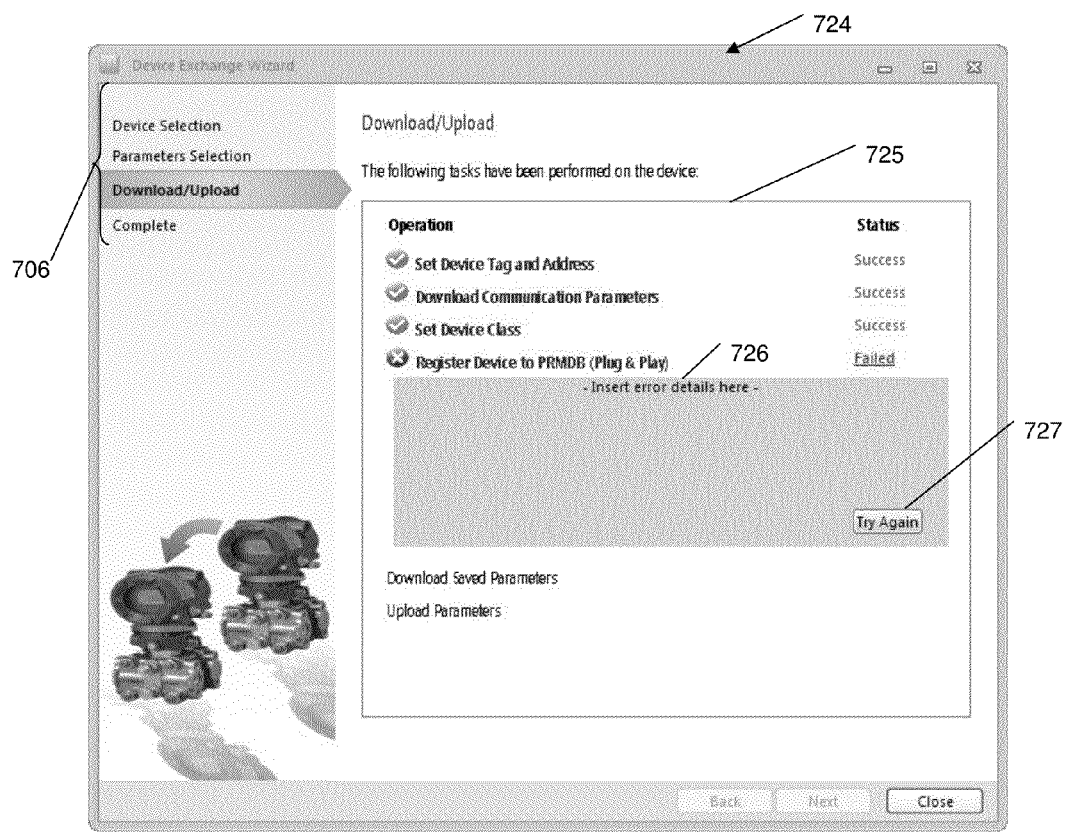
FIG. 9F is a screen shot illustrating a "Download/Upload" view of an exemplary user interface in response to interaction with a screen object.

Alternatively, if the second and first field devices are compatible, the user may continue to a user interface 714 "Parameter Selection page" as shown in FIG. 9D. The user interface 714 illustrates a pre-exchange device configuration page for enabling the user to configure the second field device. A parameter set details area 715 shows details of a parameter set related to the first field device to be copied to the second field device is shown in the user interface 714. All optional methods may be placed here. For example if the user does not want the apparatus to trigger or invoke the 'Communication Parameters Download' function, he/she can leave a checkbox 717 as unmarked. If the user wishes to return to the user interface 705 to, for example, select another first field device, a back function feature 718 may be selected. Alternatively, the user can also change the parameter set as listed in the parameter set details area 715 by selecting a change parameter feature 716 to go to a user interface 720 ("Parameter Set Selection page") as shown in FIG. 9E. A parameter set selection area 721 lists a plurality of parameter sets related to the first field device. After the parameter set is determined by double clicking on a parameter set (for example, row 722) to be downloaded to the second field device, the user is redirected to the user interface 714. A back function feature 723 may be regarded as a Cancel function feature and used by the user if the user does not choose to change the parameter set as listed in the parameter set details area 715. To proceed to download/upload operations or device-related tasks to generated and performed on the second field device as shown in a user interface 724 of FIG. 9F, the user may select a next function feature 719 in the user interface 714 of FIG. 9D. The progress as well as the result and other details of each function or device related task may also be shown in a task status area 75. On the other hand, if there are any errors in any of the device related tasks performed by the apparatus, details of the error of each device related task may be listed in an error details field 726. Alternatively, the user may choose to perform a failed operation or task by selecting a user selectable screen object 727.

Figure 9G:
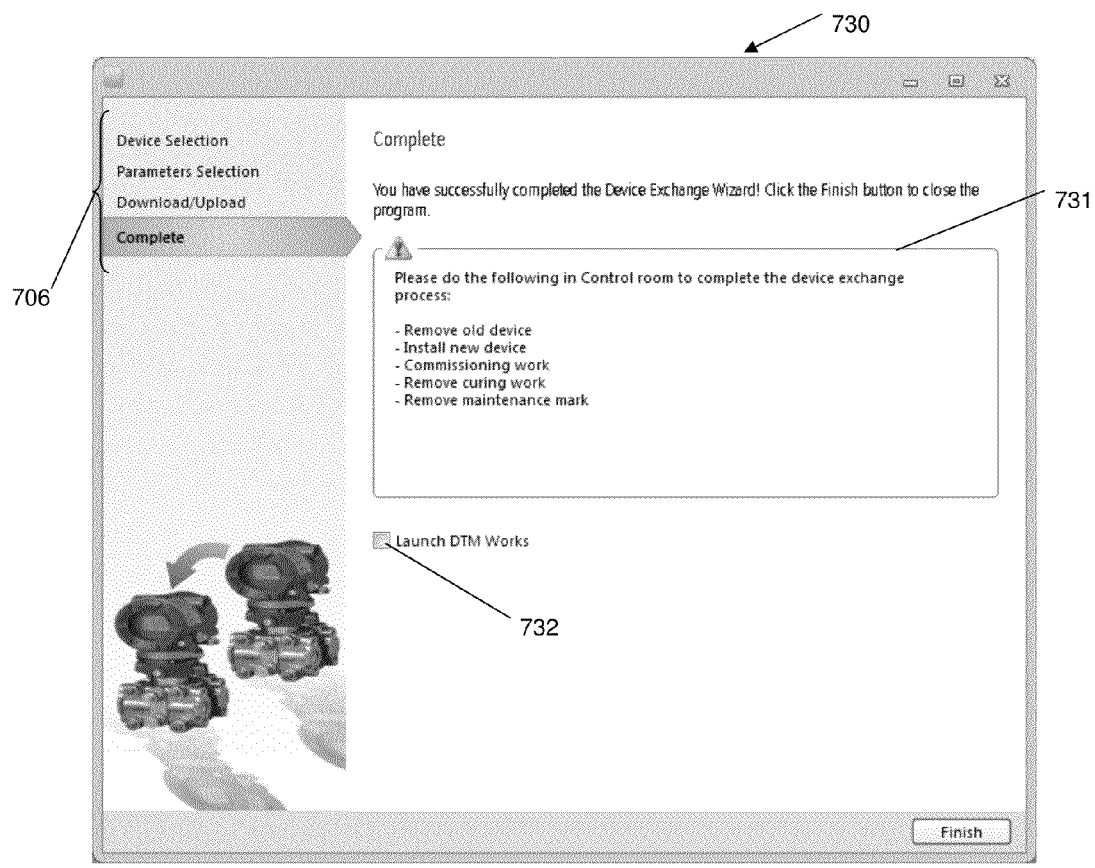
FIG. 9G is a screen shot illustrating a status view of an exemplary user interface displaying an user selectable screen object for implementing an application.

FIG. 9G is a screen shot illustrating a status view of an exemplary user interface 730 displaying an user selectable screen object 732 for implementing an application. As shown in FIG. 8G, after completing the steps in determining compatibility and performing device related tasks on a second field device for exchange with a first field device, the user has an option to launch a program/s by selecting an user selectable screen object such as for example, by selecting a check box feature 732 before selecting another user selectable screen object to terminate or close the application. The check box feature 732 may be related to a program called DTM (Device Type Manager) which configures field device settings of the second field device. The user interface 730 may also display warnings or information in an information area 731 which provide instructions to instruct user on the remaining steps which must be done to satisfy and complete the whole device exchange process.

The device related tasks to be performed by the apparatus may be edited or modified. All the services to be invoked by the apparatus may be placed in a configurable file like xml, csv, txt, etc (or in a database). For example, the method name, web service address (if function is exposed as a web service), parameters and other required information should be put in the file and all methods must be arranged accordingly. The configurable file may be configured or set according to the operations related to configuring the second field device by renaming, arranging and deletion of the operations in the list of "Download/Upload operations". Still further, if the operations need to be re-arranged, the configurable file may be configured accordingly.

FIG. 10 is a screen shot illustrating an exemplary user interface 740 for performing a compatibility check of the second field device in an embodiment. A menu list view 741 on the user interface 740 lists the steps of replacing an existing field device (first field device) with a new field device (second field device). A device details area 742 lists data related to the first and second field devices including but not limited to the physical device tag names, device ID, device address, communication type, vendor, model, device revision and device class. If the apparatus determines that the vendor, model and revision of first and second field devices are not the same and based from the compatibility look-up table/file the field devices are still not compatible, the user cannot proceed with the device exchange as seen in a compatibility check result area 746. However, the user may change the first field device using a change feature 745 to select another one of a plurality of field devices if the first field device displayed in the device details area 742 is not the field device to be replaced.

If the apparatus determines based on a result of the first compatibility check that the first and second field devices are not compatible in that the vendor, model and device revision values or details as listed in area 743 and area 744 are not the same, a second compatibility check such as a Look-up Table Compatibility Check may be initiated by the apparatus to determine whether the second field device is compatible with the first field device by using a look-up table 747 similar to the look up table 300 of FIG. 4 which contains different combinations of compatible field devices. The apparatus 21 may search for a predetermined combination of compatible field devices in the compatibility look-up table by comparing the Manufacturer ID (not displayed in the device details area 742), Device Type and Device Revision details of the first and second field devices with the Manufacturer ID, Device Type and Device Revision details in each predetermined combination of compatible devices in the table 747.

If the apparatus 21 finds the combination of compatible field devices in the look-up table for example in row 748, the first and second field devices will be determined to be compatible (or more specifically, "logically incompatible, but look-up table compatible"), and a result of the second compatibility check will be generated for display in the compatibility check result area 746. It will be appreciated that any number of predetermined combinations of compatible field devices may be incorporated in the table 747 or a compatible look up table in an embodiment of the invention. Since traversing each row would take time especially in the future when the table is supplied with many values, the second compatibility check may be initialized after it is determined in a first compatibility check that the first and second devices do not pass the logical check or are not compatible so as to expedite the compatibility check process. However, it will be appreciated that the compatibility check may also comprise performing the look up table compatibility check only or before performing the logical check. A result of a compatibility check may be displayed in a display as shown in the compatibility check result feature 746 in the interface 740. It will be appreciated that a font colour of a compatibility check item (vendor, model, revision) may be different for each of the first and second field devices according to the different values between the first and second field devices. For example, if the first field device has a different device revision from a device revision of the second field device, the font colour of the device revision check item may be indicated in a different colour from the other compatibility check items.

An advantage of the present invention according to one or more embodiments is that the device-related tasks are managed by the apparatus and therefore making it easier for a user to replace a field device. For instance, the only thing the user should do is to remove a first field device and/or connect a new device from the field network or a segment and run the apparatus or a program configured to perform a method of configuring a second field device for replacing a first field device in an industrial process over a network as described in the method 40 of FIG. 5. All other operations taken care of by the apparatus include but are not limited to:

1.) Modify Device Tag/Address
2.) Register/Update device information to the database
3.) Download saved parameters
4.) Device Inheritance
5.) Upload parameters Instead of the user running the applications from the asset management system one by one, all device configurations related to replacing an existing field device with a new field device may be handled and automated by the apparatus 21. In an embodiment, there is a machine readable medium, having stored thereon machine readable instructions for executing, in a machine, all the steps of a method 40, 50, 61, 80, such as for example as a software program package inside the asset management system 22 that can be seen and run from the toolbar or from the context menu. The user can select a first field device based on the apparatus' search for currently connected devices or disconnected devices, both of the same communication type, configure the second field device using the apparatus, and remove and transfer the second field device to the path or segment where the first field device was installed. Removing and connecting of field devices can be done before or after running the apparatus. Installing of a second field device is also not necessary in order to initiate the apparatus for determining compatibility of the field devices.

The apparatus automatically searches for disconnected field device/s and displays the first record as a default first field device. If there are no disconnected field devices found, the apparatus will retrieve the field devices that have the same communication type as the second (or the selected) field device and display the retrieved field devices in an old device list. If the default first field device is not the one the user wants to replace, the user may choose from a plurality of field devices of which the search results are retrieved by the apparatus. Still further, aside from operating and automating device-related tasks, the apparatus also performs a compatibility check to determine if the first and second field devices are valid for exchange. The compatibility check may include a first compatibility check followed by a second compatibility check. The first compatibility check is done by comparing the devices' vendor, model and revision. If the values are not the same, the devices are checked against a compatibility look-up table to validate if the devices are compatible.

An advantage of the present invention is that the apparatus provides a set of complete methodologies that is arranged in a logical and systematic manner so as to ensure that specific tasks for a type or category of field device are not missed. These functions are all API (Web Service/WCF/class library, etc) and are invoked by the apparatus. If some tasks have not been executed properly or if some fail, the apparatus may be configured to generate, for display, the error details. For example, if one task fails, the other and succeeding tasks will not be executed or performed by the apparatus. However, the user may re-run a failed or a cancelled task operation. Generally, the apparatus not only makes it easy for the user to replace a first field device but it also enables that all required actions have been performed on the second field device as well as the database. It also makes sure that the field devices are compatible before proceeding with the device exchange so as to prevent errors in installation of incompatible field devices which can cause faults in an industrial process flow.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. Apparatus for determining operation compatibility of a first field device and a second field device, the second field device being a candidate for replacing the first field device in an industrial process, and the first and second field devices configured to communicate using the same communications protocol, the apparatus comprising:
   a processor; and
   a memory containing instructions which, when executed under control of the processor, control the apparatus to:
   retrieve data relating to the first field device and data relating to the second field device, the data including at least one of a device tag, a device ID, a device address, a communication type, a vendor, a model, a device revision, and a device class;
   perform a compatibility check based on the data relating to the first and second field devices to determine whether the second field device is compatible as a replacement for the first field device in the industrial process, with at least one of the first field device and the second field device not being in operation; and
   generate, for display on a display, a result of the compatibility check.

2. Apparatus according to claim 1 configured, under control of the processor, to perform the compatibility check by performing a first compatibility check including comparing the data of the first field device with the data of the second field device to determine whether the data of the first and second field devices are the same.

3. Apparatus according to claim 1, configured, under control of the processor to perform the compatibility check by performing a first compatibility check including:
   initiating a lookup module providing predetermined combinations of compatible field devices;
   comparing the data relating to the first field device and the data relating to the second field device with the predetermined combinations of compatible field devices.

4. Apparatus according to claim 2 configured, under control of the processor to perform the compatibility check by:
performing a second compatibility check including initiating a lookup module providing predetermined combinations of compatible field devices; and
comparing the data relating to the first field device and data relating to the second field device with the predetermined combinations of compatible field devices.

5. Apparatus according to claim 3 or claim 4, wherein one of the predetermined combinations of compatible field devices have data different from the data of the second field device.

6. Apparatus according to any of claims 1 to 4 configured, under control of the processor, prior to retrieving data relating to the first field device and data relating to the second field device, to: search for one of a plurality of field devices configured to communicate using the same communications protocol as the second field device, the one of the plurality of field devices being the first field device.

7. Apparatus according to any of claims 1 to 4 configured, under control of the processor to:
generate, for display on the display, a result of the compatibility check being that the second field device is compatible with the first field device;
generate, for display on the display, a first user-selectable screen object for requesting one of a plurality of device-related tasks to be performed on the second field device.

8. Apparatus according to claim 7 configured, under control of the processor to:
generate, for display on the display, a second user-selectable screen object for requesting information identifying one or more parameters related to the first field device based on a result of the compatibility check being that the second field device is compatible with the first field device.

9. Apparatus according to claim 8 configured, under control of the processor to:
receive a request for information identifying one or more parameters related to the first field device;
retrieve the information identifying one or more parameters related to the first field device from a database server;
generate, for display on the display, the one or more parameters related to the first field device.

10. Apparatus according to claim 9 configured, under control of the processor to present a graphical user interface on the display, the graphical user interface being configured to allow the user to select the one or more parameters related to the first field device to be transferred to the second field device.

11. Apparatus according to claim 10 configured, under control of the processor to:
receive a request to select the one or more parameters related to the first field device to be transferred to the second field device;
initiate execution of a parameter module for transferring the one or more parameters to the second field device.

12. Apparatus according to any of claims 1 to 4, wherein the display is a display of the apparatus or a display of a terminal different from the apparatus.

13. Method for determining operation compatibility of a first field device and a second field device, the second field device being a candidate for replacing the first field device in an industrial process, and the first and second field devices configured to communicate using the same communications protocol, the method comprising:
retrieving, using a processor, data relating to the first field device and data relating to the second field device, the data including at least one of a device tag, a device ID, a device address, a communication type, a vendor, a model, a device revision, and a device class;
performing, using the processor, a compatibility check based on the data relating to the first and second devices to determine whether the second field device is compatible as a replacement for the first field device in the industrial process, with at least one of the first field device and the second field device not being in operation; and
generating, using the processor, for display on a display, a result of the compatibility check.

14. Method according to claim 13, wherein performing the compatibility check includes performing a first compatibility check including comparing the data of the first field device with the data of the second field device to determine whether the data of the first and second field devices are the same.

15. Method according to claim 13, wherein performing the compatibility check includes performing a first compatibility check including:
initiating a lookup module providing predetermined combinations of compatible field devices;
comparing the data relating to the first field device and the data relating to the second field device with the predetermined combinations of compatible field devices.

16. Method according to claim 14, wherein performing the compatibility check includes:
performing a second compatibility check including initiating a lookup module providing predetermined combinations of compatible field devices; and
comparing the data relating to the first field device and data relating to the second field device with the predetermined combinations of compatible field devices.

17. Method according to claim 15 or claim 16, wherein one of the predetermined combinations of compatible field devices have data different from the data of the second field device.

18. Method according to any one of claims 13 to 16 further comprising, prior to retrieving data relating to the first field device and data relating to the second field device, searching, using the processor, for one of a plurality of field devices configured to communicate using the same communications protocol as the second field device.

19. Method according to any of claims 13 to 16 further comprising:
generating, using the processor, for display on the display, a result of the compatibility check being that the second field device is compatible with the first field device;
generating, using the processor, for display on the display, a first user-selectable screen object for requesting one of a plurality of device-related tasks to be performed on the second field device.

20. Method according to claim 19 further comprising, using the processor:
generating, for display on the display, a second user-selectable screen object for requesting information identifying one or more parameters related to the first field device based on a result of the compatibility check being that the second field device is compatible with the first field device.

21. Method according to claim 20 further comprising:
receiving, using the processor, a request to select the one or more parameters related to the first field device to be transferred to the second field device;

retrieving, using the processor, information identifying one or more parameters from a database server based on a result of the compatibility check being that the first field device is compatible with the second field device, the one or more parameters being related to the first field device;

generating, using the processor, for display on the display, the one or more parameters related to the first device.

22. Method according to claim 21 wherein generating the one or more parameters include a graphical user interface on the display, the graphical user interface being configured to allow the user to select the one or more parameters related to the first field device to be transferred to the second field device.

23. Method according to claim 21 further comprising initiating, using the processor, execution of a parameter module for transferring the one or more parameters to the second field device.

24. Method according to any of claims 13 to 16, wherein the display is a display of the apparatus or a display of a terminal different from the apparatus.

25. A machine readable medium, having stored thereon machine readable instructions for executing, in a machine, all the steps of the method according to any one of claims 14 to 16.

* * * * *